(12) United States Patent
Zhai et al.

(10) Patent No.: US 11,768,754 B2
(45) Date of Patent: Sep. 26, 2023

(54) PARALLEL PROGRAM SCALABILITY BOTTLENECK DETECTION METHOD AND COMPUTING DEVICE

(71) Applicant: Tsinghua University, Beijing (CN)

(72) Inventors: Jidong Zhai, Beijing (CN); Yuyang Jin, Beijing (CN); Wenguang Chen, Beijing (CN); Weimin Zheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/017,883

(22) PCT Filed: Aug. 27, 2020

(86) PCT No.: PCT/CN2020/111588
§ 371 (c)(1),
(2) Date: Jan. 25, 2023

(87) PCT Pub. No.: WO2022/041024
PCT Pub. Date: Mar. 3, 2022

(65) Prior Publication Data
US 2023/0244588 A1 Aug. 3, 2023

(51) Int. Cl.
G06F 9/44 (2018.01)
G06F 11/34 (2006.01)
G06F 8/41 (2018.01)

(52) U.S. Cl.
CPC .......... *G06F 11/3466* (2013.01); *G06F 8/433* (2013.01)

(58) Field of Classification Search
USPC ...................................................... 717/172
See application file for complete search history.

(56) References Cited

U.S. PATENT DOCUMENTS

2018/0039570 A1* 2/2018 Rajagopalan ....... G06F 11/3676
2018/0046565 A1* 2/2018 Lu ....................... G06F 11/3636
(Continued)

FOREIGN PATENT DOCUMENTS

CN 101661409 A 3/2010
CN 102790695 A 11/2012
(Continued)

OTHER PUBLICATIONS

Adhianto, Laksono, et al. "HPCToolkit: Tools for performance analysis of optimized parallel programs." Concurrency and Computation: Practice and Experience 22.6 (2010): 685-701.
(Continued)

*Primary Examiner* — Anna C Deng
(74) *Attorney, Agent, or Firm* — IPRO, PLLC

(57) ABSTRACT

A computer executed parallel program scalability bottleneck detection method is provided, which includes: building a program structure graph for a program source code; collecting performance data based on a sampling technique during runtime; the performance data including: performance data of each vertex of the program structure graph and inter-process communication dependence of communication vertices; building a program performance graph by filling the program structure graph with the collected performance data, the program performance graph recording data and control dependence of each process as well as inter-process communication dependence; detecting problematic vertices from the program performance graph, and starting from some or all of the problematic vertices, backtracking through data/control dependence edges within a process and communication dependence edges between different processes, to detect scalability bottleneck vertices.

16 Claims, 3 Drawing Sheets

(56) References Cited

U.S. PATENT DOCUMENTS

| | | | | |
|---|---|---|---|---|
| 2018/0137083 | A1* | 5/2018 | Aramon | G06F 17/16 |
| 2020/0226124 | A1* | 7/2020 | Chishti | G06F 16/9024 |
| 2021/0182200 | A1* | 6/2021 | Liao | H01L 25/18 |
| 2023/0013870 | A1* | 1/2023 | Hashimoto | G06N 3/0455 |
| 2023/0095655 | A1* | 3/2023 | Hossain | G01C 21/3867 |
| | | | | 701/420 |

FOREIGN PATENT DOCUMENTS

| | | |
|---|---|---|
| CN | 104380344 A | 2/2015 |
| CN | 106294136 A | 1/2017 |

OTHER PUBLICATIONS

Geimer, Markus, et al. "The Scalasca performance toolset architecture." Concurrency and computation: Practice and experience 22.6 (2010): 702-719.

Calotoiu, Alexandru, et al. "Using automated performance modeling to find scalability bugs in complex codes." Proceedings of the International Conference on High Performance Computing, Networking, Storage and Analysis. 2013.

* cited by examiner

PARALLEL PROGRAM SCALABILITY BOTTLENECK DETECTION METHOD AND COMPUTING DEVICE

TECHNICAL FIELD

The present disclosure generally relates to research on parallel program scalability, and more particularly, to a parallel program scalability bottleneck detection technology.

BACKGROUND

A decade after Dennard scaling ended and clock frequencies have stalled, increasing core count remains the only option to boost computing power. Top-ranked supercomputers already contain millions of processor cores, such as ORNL's Summit with 2,397,824 cores, LLNL's Sierra with 1,572,480 cores, and Sunway TaihuLight with 10,649,600 cores. This unprecedented growth in the last years shifted the complexity to the developers of parallel programs, for which scalability is a main concern now. Unfortunately, not all parallel programs have caught up with this trend and cannot efficiently use modern supercomputers, mostly due to their poor scalability.

Scalability bottlenecks can have a multitude of reasons ranging from issues with locking, serialization, congestion, load imbalance, and many more. They often manifest themselves in synchronization operations and finding the exact root cause is hard. Yet, with the trend towards larger core count continuing, scalability analysis of parallel programs becomes one of the most important aspects of modern performance engineering.

Researchers have made great efforts in scalability bottleneck identification using three fundamental approaches: application profiling, tracing, and modeling.

Profiling-based approaches collect statistical information at runtime with low overhead. Summarizing the data statistically loses important information such as the order of events, control flow, and complex dependence. Thus, such approaches can only provide a coarse insight into application bottlenecks and substantial human efforts are required to identify the root cause of scaling issues (also called scalability bottlenecks).

Tracing-based approaches capture performance data as time series, which allows tracking dependence and time series to identify root causes of scaling issues. Their major drawback is the often prohibitive storage and runtime overhead of the detailed data logging. Thus, such tracing-based analysis can often not be used for large-scale programs.

Modeling-based approaches may also be used to identify scalability bottlenecks with low runtime overhead. However, building accurate performance models usually requires significant human efforts and skills. Furthermore, establishing full performance models for a complex application with many input parameters requires many runs and prohibitively expensive. Thus, we conclude that identifying scalability bottlenecks for large-scale parallel programs remains an important open problem.

SUMMARY

In view of the above situations, the present disclosure is proposed.

According to one aspect of the present disclosure, there is provided a parallel program scalability bottleneck detection method, for identifying scalability bottlenecks of a parallel program; the method includes: building a program structure graph based on source code of a program; collecting performance data based on a sampling technique during runtime, the performance data including: performance data of each vertex of the program structure graph (e.g., hardware counter performance data) and inter-process communication dependence of communication vertices; building a program performance graph by filling the program structure graph with the collected performance data, the program performance graph recording data and control dependence of each process as well as inter-process communication dependence; detecting problematic vertices from the program performance graph, and starting from some or all of the problematic vertices, backtracking through data/control dependence edges within a process and communication dependence edges between different processes, to automatically detect a vertex where an scalability bottleneck is located.

Optionally, the problematic vertex detection from the program performance graph includes detecting non-scalable vertices and abnormal vertices. A non-scalable vertex refers to a vertex whose "performance-process count" curve does not reach a pre-defined performance growth standard (e.g., an average performance growth slope of all vertices) when the process count increases; and an abnormal vertex refers to a vertex whose difference from other vertices is greater than a pre-defined threshold during comparison of performance data of a same vertex between different processes.

Optionally, the backtracking includes: reversing all edges in the program performance graph; backtracking through data/control dependence edges within a process and communication dependence edges between different processes, until root vertices or collective communication vertices are accessed; and taking vertices on backtracking paths as candidates for the vertex where the potential scalability bottleneck is located.

Optionally, the parallel program scalability bottleneck detection method further includes: only preserving the communication dependence edge if a waiting event exists, and pruning other communication dependence edges, to reduce searching space for backtracking.

Optionally, the building a program structure graph includes: obtaining a preliminary program structure graph at compile time; contracting the program structure graph, including removing edges that meet pre-defined criteria in the program structure graph and merging a plurality of vertices into one vertex.

Optionally, the removing edges that meet pre-defined criteria in the program structure graph includes: only preserving a structure including MPI invocations and loops; and removing the loop vertex whose nested depth exceeds the pre-defined threshold.

Optionally, the merging a plurality of vertices into one vertex includes: merging continuous vertices with tiny workload into a larger vertex, for computation vertices in the program structure graph.

Optionally, the collecting performance data based on sampling includes: collecting hardware counter performance data of each vertex of the program structure graph when the parallel program is running, wherein, the hardware counter interface is configured to sample and collect hardware performance data, the program is interrupted at regular clock cycles and program call stack and related performance data are recorded; and associating performance data with the corresponding program structure graph vertex, according to the program call stack information.

Optionally, the collecting inter-process communication dependence, includes: sampling-based instrumentation, wherein, the inserted code that collects performance data is executed based on sampling.

Optionally, the sampling-based instrumentation includes: executing the statement that generates a random number at the beginning of the inserted code; generating one random number every time the inserted code is executed, judging whether the random number falls into an interval of a pre-defined threshold; and collecting performance data only when the random number falls into the interval of the pre-defined threshold.

Optionally, the collecting inter-process communication dependence, includes: graph-guided communication compression, wherein, communication operation parameters are only recorded once for repeated communications with the same parameters, and communication operations on a same group of program structure graph vertices for different time steps are merged together.

Optionally, the collecting performance data further includes: collecting calling information before the entry and exit of indirect calls, linking the call information with real function calls with unique function IDs, and then refining the program structure graph obtained after the inter-procedural analysis.

Optionally, the collecting inter-process communication dependence, includes: (1) using MPI_Comm_get_info to acquire the information, for collective communication; (2) recording the source or dest process and tag directly, for blocking point to point communication; and (3) using status parameter of synchronous communication function (e.g., MPI_Wait) to obtain communication dependence, for non-blocking communication.

Optionally, it further includes: obtaining one or more causal paths that connect a set of problematic vertices, as scalability bottleneck candidates.

According to another aspect of the present disclosure, there is provided a computing device, including a memory and a processor, wherein, the memory has computer executable instructions stored thereon, and the executable instructions execute the method according to any one of the above items when executed by the processor.

By using the parallel program scalability bottleneck detection method according to the embodiment of the present disclosure, building the program structure graph, and collecting the performance data based on the sampling technique during runtime, the performance data can be accurately collected with low overhead; the program performance graph is obtained by filling the program structure graph with the collected performance data, and by detecting the problematic vertices in the program performance graph, and locating the vertices of the scalability bottlenecks through backtracking, which provides a low overhead, accurate technology for detecting the scalability bottlenecks.

DETAILED DESCRIPTION

Embodiments of the present disclosure will be described below in conjunction with the accompanying drawings.

Figure 1:
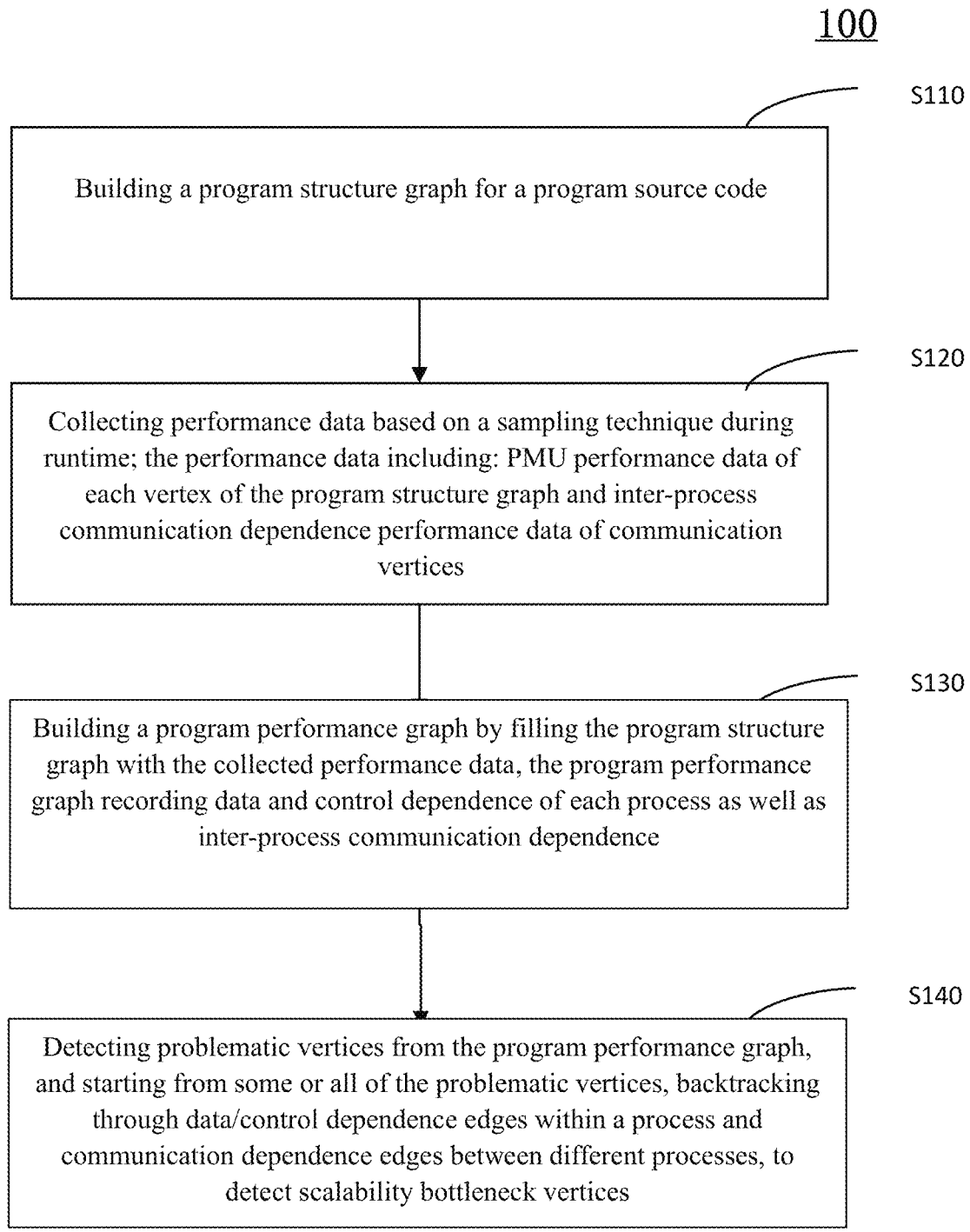
FIG. 1 shows an overall flow chart of a computer executed parallel program scalability bottleneck detection method 100 according to an embodiment of the present disclosure.

FIG. 1 shows an overall flow chart of a computer executed parallel program scalability bottleneck detection method 100 according to an embodiment of the present disclosure; and the parallel program scalability bottleneck detection method is used for identifying scalability bottlenecks of a parallel program.

In step S110, a program structure graph is built for a program source code.

In one example, the building a program structure graph includes: obtaining a preliminary program structure graph at compile time; contracting the program structure graph, including removing edges that meet pre-defined criteria in the program structure graph and merging a plurality of vertices into one vertex.

The program structure graph of respective processes may be regarded as a logical skeleton of the parallel program. In the program structure graph, vertices represent main computation and communication components as well as program control units. An Edge represent an execution order based on data and control flow. The vertices have different types, including Branch, Loop, Function call and Comp, among which, Comp is a collection of computation instructions, while the others are basic program structures.

The obtaining a preliminary program structure graph includes phases of intra-procedural analysis and inter-procedural analysis. During intra-procedural analysis, a structure graph is firstly built for each function. Then, through an inter-procedural algorithm, a complete program structure graph is obtained. Finally, the program structure graph is further refined through graph contraction.

Intra-procedural analysis: during the intra-procedural analysis phase, a structure graph is built for each function. The basic idea is that the control flow graph of the procedure is traversed based on the Intermediate Representation (IR) of the program, to identify loops, branches, and function calls, and then connect these components based on their dependence to form a per-function structure graph.

Inter-procedural analysis: inter-procedural analysis is to combine program structure graphs of all the functions into a complete graph. It starts by analyzing the Program's Call Graph (PCG), which contains all calling relationships between different functions. And then a top-down traversal is performed from the structure graph of the main function, to find a user-defined function corresponding to each call in the Program's Call Graph, and replace all user-defined functions with the structure graph of each function. We just keep MPI communication function calls. For indirect function calls, we need to process them after collecting certain function call relationships at runtime.

In the program structure graph generation procedure of the foregoing example, the program structure graphs are normally too large to be analyzed efficiently for real applications since corresponding vertices need to be created for any loop and branch in their source code. However, the workload of some vertices can be ignored as collecting performance data for these vertices only introduces large overhead without benefits. To address this problem, graph contraction is performed to reduce the size of the generated program structure graph.

As described above, the contracting the program structure graph includes removing edges that meet pre-defined criteria in the program structure graph and merging a plurality of vertices into one vertex.

In one example, the removing edges that meet pre-defined criteria in the program structure graph includes: only preserving a structure including MPI invocations and loops; and removing the loop vertex whose nested depth exceeds the pre-defined threshold.

In one example, the merging a plurality of vertices into one vertex includes: merging continuous vertices with tiny workload into a larger vertex, for computation vertices in the program structure graph.

Specifically, the rules of contraction affect granularity of the graph and the representation of communication and computation characteristics. Considering that communication is normally the main scalability bottleneck for parallel programs, all MPI invocations and related control structures are preserved. For computation vertices in the program structure graph, continuous vertices may be merged into a larger vertex. Specifically, for the structures that do not include MPI invocations, only Loop is preserved because computation produced by loop iterations may dominate program performance. In addition, a user-defined parameter, MaxLoopDepth may be provided as a threshold, to limit the depth of nested loops and keep the graph condensed in one example.

In step S120, the performance data is collected based on the sampling technique during runtime, and the performance data includes: performance data of each vertex of the program structure graph and inter-process communication dependence of communication vertices.

Associate vertices with performance data: the performance data for each vertex of the program structure graph is collected at runtime, which is essential for further analysis of scaling issues. Unlike traditional coarse-grained profiling methods, in the embodiment of the present disclosure, performance data is collected according to the granularity of each program structure graph vertex. One main advantage is that the graph structure and performance data are combined for more accurate performance analysis. Specifically, each program structure graph vertex is associated with a performance vector that records the execution time and key hardware performance data, such as cache miss rate and branch miss count.

The embodiment of the present disclosure innovatively uses the sampling technique for performance profiling to collect relevant performance metrics with very low overhead.

In one example, the collecting performance data based on sampling includes: collecting performance data of each vertex of the program structure graph during runtime, the performance data of the vertex contains hardware counter performance data, and the hardware counter performance data includes, but is not limited to, executed cycle count, executed instruction count, load/store instruction count, floating point computing instruction count, cache hit or miss count, and branch prediction miss count, etc. The hardware counter interface is configured to sample and collect hardware performance data, wherein, the program is interrupted at regular clock cycles and program call stack and related performance data are recorded; and associate performance data with the corresponding program structure graph vertex, according to the program call stack information. In addition to hardware counter performance data, the performance data of the vertex can also be user-defined performance data in software, for example, user manual timing, or manual statistics of a certain variable.

In one example, the program call graph cannot be fully obtained by the static analysis due to indirect calls (e.g., function pointers), so it is necessary to collect the calling information of indirect calls at runtime and subsequently fill such information into the program structure graph. Specifically, calling information is collected before the entry and exit of indirect calls and the calling information is linked with real function calls with unique function IDs, and then the program structure graph obtained is refined after the inter-procedural analysis.

During static analysis, in the embodiments of the present disclosure, data and control dependence within each process is derived. At runtime, it is necessary to further collect communication dependence between different processes for inter-process dependence analysis. In traditional tracing-based methods, each communication operation is recorded and dependence thereof is analyzed, which causes large collection overhead and also huge storage cost. The embodiments of the present disclosure propose two key techniques to address this problem: sampling-based instrumentation and graph-guided communication compression.

The sampling-based instrumentation according to the embodiment of the present disclosure is proposed in consideration of trade-off between the runtime overhead of instrumentation and integrity of capturing the dynamic program behavior. Full instrumentation of events and recording complete data always introduce large overheads. The dynamic program behavior may be missed if the instrumentation is recorded only once.

To reduce the runtime overhead and still capture the dynamic program behavior along with the program execution, the present disclosure adopts a random sampling-based instrumentation technique. Specifically, as an implementation example, a random number is generated every time when the instrumentation is executed; when the random number falls into an interval of the pre-defined threshold, communication parameters are recorded. The random sampling technique used here can avoid missing regular communication patterns as much as possible even if they change at runtime.

Another key technology proposed by the embodiment of the present disclosure is graph-guided communication compression; a typical parallel program contains a large number of communication operations. Due to the redundancy between different loop iterations, not all the communication operations need to be recorded. As the program structure graph already represents the program's communication structure, we can leverage the program structure graph to reduce communication records. Our core idea is that communication operation parameters are only recorded once for repeated communications with the same parameters. Meanwhile, communication operations on a same group of program structure graph vertices for different time steps are merged together, which may further reduce the storage cost and ease the analysis of inter-process dependence.

In an example, the MPI standard Profiling interface (PMPI) is used for effective communication collection, which does not need to modify the source code. For different communication types, different methods may be adopted to collect dependence thereof. In a preferred example, there are three common classes of communication:

(1) For collective communication, MPI_Comm_get_info may be used to acquire this information, in MPI programs;

(2) For blocking point to point communication, the source or dest process and tag may be recorded directly;

(3) For non-blocking communication, some information will not be available until final checking functions are invoked (e.g., MPI_Wait); in addition, in some cases, for example, MPI_ANY_SOURCE and MPI_ANY_TAG, the source or tag of the reception procedure is uncertain. In these cases, we need to use the parameter of status to identify the communication dependence; and the parameter of status includes MPI_SOURCE and MPI_TAG of the received message.

After completing step S120, it proceeds to step S130.

In step S130, a program performance graph is built by filling the program structure graph with the collected performance data; and the program performance graph records data and control dependence of each process as well as inter-process communication dependence.

As each process shares the same source code, we can duplicate the program structure graph for all processes. Then inter-process edges are added based on communication dependence collected at the runtime analysis. For point to point communications, we match the sending and receiving processes. For collective communications, we associate all involved processes.

Note that the final program performance graph not only includes the data and control dependence for each process, but also records the inter-process communication dependence. In addition, we also attribute key performance data for each vertex, which will be used for further scaling issue detection. For a given vertex in the program performance graph, performance thereof may be affected by either its own computation patterns or the performance of other vertices connected through data and control dependence within one process as well as communication dependence between different processes.

In step S140, problematic vertices are detected from the program performance graph, and starting from some or all of the problematic vertices, backtracking is performed through data/control dependence edges within a process and communication dependence edges between different processes, to detect scalability bottleneck vertices.

The detecting problematic vertices from the program performance graph includes detecting non-scalable vertices and abnormal vertices; a non-scalable vertex refers to a vertex whose "performance-process count" curve does not reach a pre-defined performance growth standard when the process count increases; and an abnormal vertex refers to a vertex whose difference from other vertices is greater than a pre-defined threshold during comparison of performance data of a same vertex between different processes. This is based on our observation: a final program performance graph has been generated from a given program; although the inter-process communication dependence may change with the different numbers of processes, the per-process program structure graph does not change with the problem size or job scale; and thus, we propose a location-aware detection method for identifying problematic vertices. The core idea of our method is comparing the performance data of the vertex in the program performance graph which corresponds to the same vertex in the program structure graph, among different job scales (non-scalable vertex detection) and different processes for a given job scale (abnormal vertex detection).

Non-scalable vertex detection: the core idea is to find vertices in the program performance graph whose performance (execution time or hardware performance data) shows an unusual slope comparing with other vertices when the number of processes increases. When the execution time of these vertices accounts for a large proportion of the total time, they will become a scaling issue. A challenge for non-scalable vertex detection is how to merge performance data from a large number of processes. The simplest strategy is to use the performance data for a particular process for comparison but this strategy may lose some information about other processes. Another strategy is to use the mean or median value of performance data from all processes and the performance variance between different processes to reflect load distribution. We can also partition all processes into different groups, for example, odd and even processes, and then aggregate for each group. In our implementation, we test all strategies as described above and fit the merged data of different process counts with a log-log model. With these fitting results, we sort all vertices by the changing rate of each vertex when the scale increases and filter the top-ranked vertices as the potential non-scalable vertices.

Abnormal vertex detection: for a given job scale, we can also compare the performance data of the same vertex between different processes, so as to detect abnormal vertices. Since for typical Single Program Multi-Data (SPMD) programs, the same vertex tends to execute the same workload between different processes. If a vertex has significantly different execution time, we may mark this vertex as a potential abnormal vertex. A lot of reasons may cause abnormal vertices, even if we do not consider the effect of performance variance. For example, a load balance problem may cause abnormal vertices in some processes. We can also identify some communication vertices as abnormal vertices, and some processes of these vertices have much greater synchronization overhead than other processes.

After identifying the problematic vertices, it is essential to find a causal relationship between them to locate scalability bottlenecks. Based on graph analysis, the embodiment of the present disclosure proposes a novel method, referred to as a backtracking algorithm, which starts from the located problematic vertices, and automatically detects scalability bottleneck vertices and reports the corresponding line number of the source code.

In one example, the backtracking includes: reversing all edges in the program performance graph; backtracking through data/control dependence edges within a process and communication dependence edges between different processes, until root vertices or collective communication vertices are accessed, and taking vertices on backtracking paths as candidates for the scalability bottleneck vertices.

More specifically, in one example, to do the backward traversal, firstly all edges are reversed to dependence edges. The algorithm starts from the non-scalable vertices detected, then traverse backward through data/control dependence edges within a process and communication dependence edges between different processes until the root vertices or collective communication vertices are accessed. One observation is that a complex parallel program always contains a large number of dependence edges. So the search cost will be very high if optimization is not performed. However, we do not need to traverse all the possible paths to identify the root cause. Preferably, only the communication dependence edge is preserved if a waiting event exists, while other communication dependence edges are pruned. The advantage of the method is that both searching space and false positives may be reduced. Finally, several causal paths that connect a set of problematic vertices are obtained. Further analysis of these identified paths will help application developers to locate the root cause.

Figure 2:
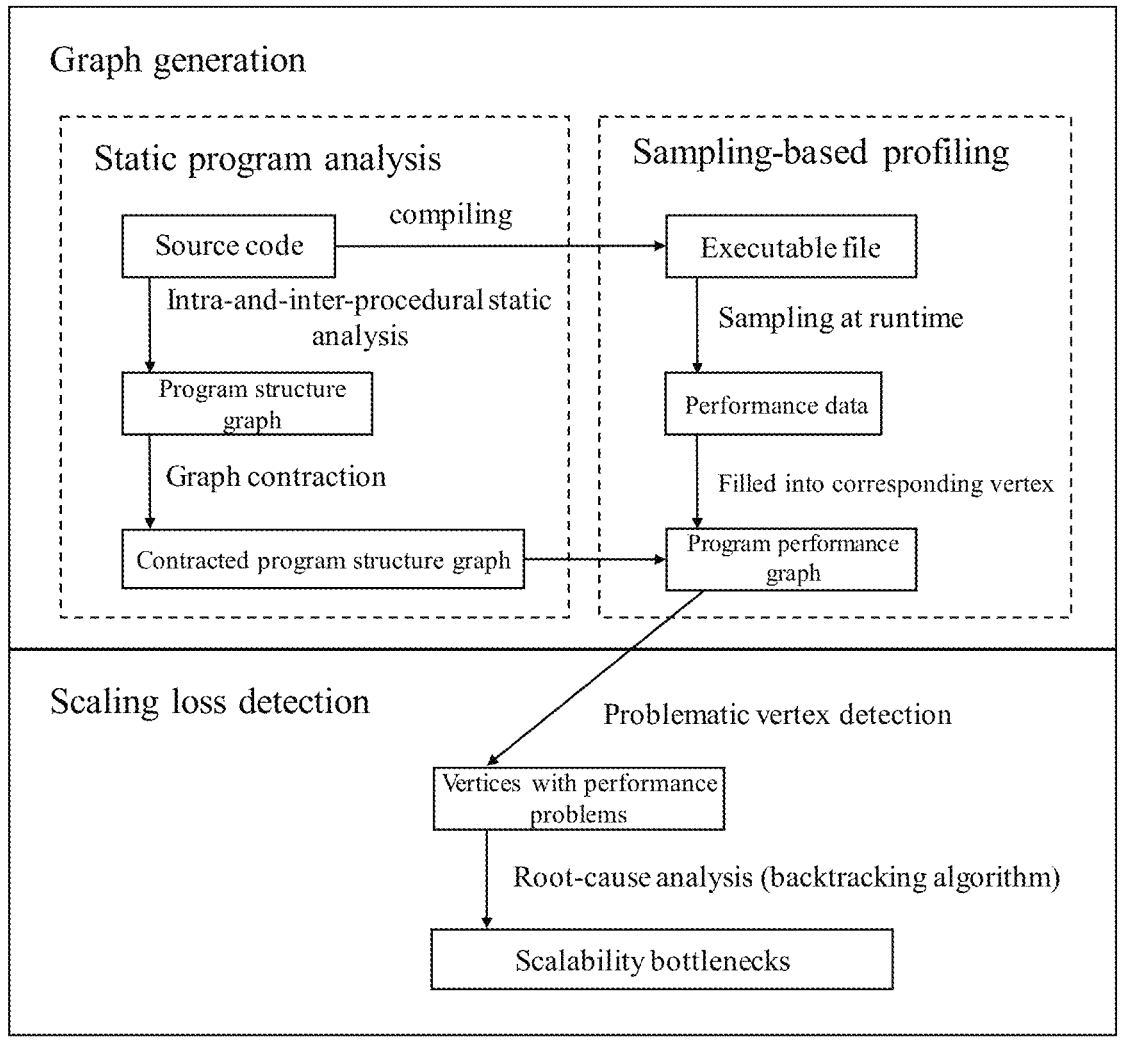
FIG. 2 shows an operation flow of an exemplary parallel program scalability bottleneck detection method according to an embodiment of the present disclosure.

Note that some vertices may be both non-scalable and abnormal vertices. The interplay of non-scalable and abnormal vertices may make the program performance even harder to understand. Sometimes, optimizing the performance of some vertices in identified paths may also improve the overall performance of the non-scalable vertex FIG. 2 shows an operation flow of an exemplary parallel program scalability bottleneck detection method according to an embodiment of the present disclosure.

The exemplary parallel program scalability bottleneck detection method consists of two main modules, graph generation and scaling loss detection. Graph generation contains two phases, static program analysis and sampling-based profiling. Static program analysis is done at compile time while the sampling-based profiling is performed at runtime. We use the LLVM compiler to automatically build a Program Structure Graph (PSG). Each vertex on the program structure graph is corresponding to a code snippet in the source code. The scaling loss detection is an offline module, which includes problematic vertex detection and root-cause analysis.

(I) Graph Generation

Program structure graph construstion. The input of the module is the source code of a parallel program. Through an intra-and-inter-procedural static analysis of the program by compiling Pass of LLVM compiler (e.g., version 3.3.0), a preliminary Program Structure Graph is obtained.

Graph Contraction. In this step, we remove unnecessary edges in the program structure graph and merge several small vertices into a large vertex, to reduce scalability analysis overhead.

Sampling-based collection of performance data and communication dependence. To effectively detect the scalability bottleneck, we leverage sampling techniques to collect the performance data for each vertex of the program structure graph and communication dependence data with different numbers of processes; here, PAPI tool (version 5.2.0) is used to collect the performance data, PMPI interface is used to collect the communication dependence, and libunwind library (version 1.3.1) is used to collect the function call stack information.

Program performance graph generation. To analyze the interplay of computation and communication between different processes, we further generate a Program Performance Graph based on per-process program structure graphs.

(II) Scaling Loss Detection

Problematic vertex detection. According to the structure of the acquired program performance graph, we design a location-aware detection method to identify all problematic vertices.

Root cause analysis (backtracking algorithm). Combined with identified problematic vertices, we propose a backtracking algorithm on top of the program performance graph and identify all the paths covering problematic vertices, which can help locate the root cause of the scaling issues (scalability bottlenecks).

Figure 3:
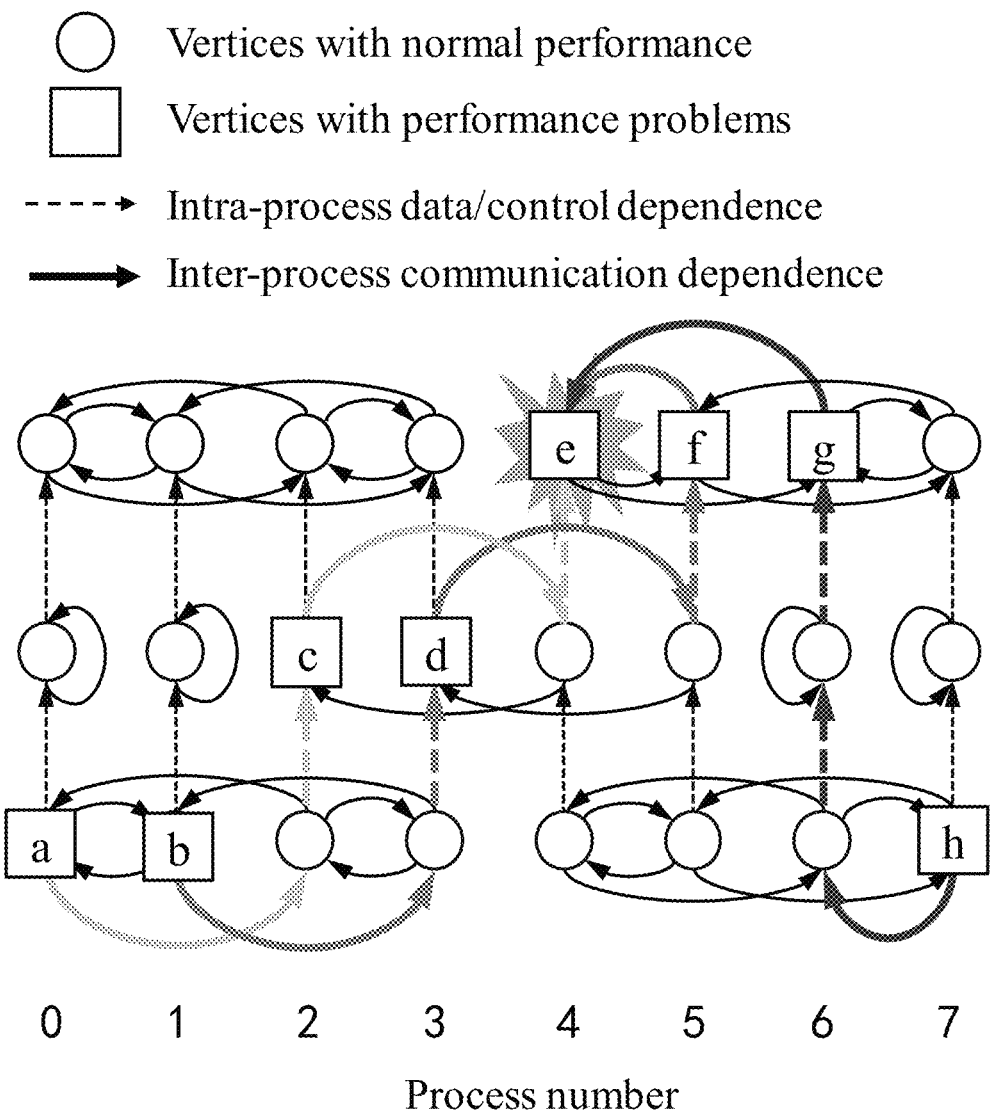
FIG. 3 shows a schematic diagram of detecting problematic vertices and backtracking scalability bottleneck vertices according to an embodiment of the present disclosure.

FIG. 3 shows a schematic diagram of detecting problematic vertices and backtracking scalability bottleneck root vertices according to an embodiment of the present disclosure.

Wherein, a program performance graph of 8 processes 0, 1, 2, 3, 4, 5, 6 and 7 is shown, dotted arrows represent intra-process data/control dependence, solid arrows represent inter-process communication dependence, circles represent vertices with normal performance, and squares represent problematic vertices. As shown in FIG. 3, problematic vertices a/b/c/d/e/f/g/h are detected, and through backtracking, vertex e in process 4 is identified as the scalability bottleneck vertex (root cause of scaling issues).

By using the parallel program scalability bottleneck detection method according to the embodiment of the present disclosure, building the program structure graph, and collecting the performance data based on the sampling technique during runtime, the performance data can be accurately collected with low overhead; the program performance graph is obtained by filling the program structure graph with the collected performance data, and by detecting the problematic vertices in the program performance graph, and locating the scalability bottleneck vertices through backtracking, which provides a low overhead, accurate technology for detecting the scalability bottleneck.

The descriptions of the respective embodiments of the present disclosure have been presented for purposes of illustration, but are not intended to be exhaustive or limited to the respective embodiments disclosed. Many modifications and variations will be apparent to those of ordinary skill in the art without departing from the scope and spirit of the described respective embodiments. Therefore, the scope of the present disclosure should be the scope of the following claims.

The invention claimed is:

1. A computer executed parallel program scalability bottleneck detection method, which is used for detecting scalability bottlenecks of a parallel program, the method comprising:

building, by a processor, a program structure graph for a program source code;

collecting, by the processor, performance data based on a sampling technique during runtime, the performance data comprises performance data of each vertex of the program structure graph and inter-process communication dependence of communication vertices;

building, by the processor, a program performance graph by filling the program structure graph with the collected performance data, the program performance graph recording data and control dependence edges of each process as well as inter-process communication dependence;

detecting, by the processor, problematic vertices from the program performance graph, the detecting problematic vertices from the program performance graph comprises detecting non-scalable vertices and abnormal vertices, wherein a non-scalable vertex refers to a vertex whose performance-process count curve does not reach a pre-defined performance growth standard when a process count increases, and an abnormal vertex refers to a vertex whose difference from other vertices is greater than a pre-defined threshold during comparison of performance data of a same vertex between different processes; and starting, by the processor, from some or all of the problematic vertices, backtracking through data and control dependence edges within a process and communication dependence edges between different processes, to detect scalability bottleneck vertices.

2. The parallel program scalability bottleneck detection method according to claim 1, wherein, the pre-defined performance growth standard is an average performance growth level of all vertices.

3. The parallel program scalability bottleneck detecting method according to claim 1, wherein, the backtracking comprises:

reversing all edges in the program performance graph;

backtracking through data and control dependence edges within a process and communication dependence edges between different processes, until root vertices or collective communication vertices are accessed; and taking vertices on backtracking paths as candidates for scalability bottleneck vertices.

4. The parallel program scalability bottleneck detection method according to claim 1, further comprising:

only preserving the communication dependence edge if a waiting event exists, and pruning other communication dependence edges, to reduce searching space for backtracking.

5. The parallel program scalability bottleneck detection method according to claim 1, wherein, the building the program structure graph comprises:

obtaining a preliminary program structure graph at compile time; and contracting the program structure graph, comprising removing edges that meet pre-defined criteria in the program structure graph and merging a plurality of vertices into one vertex.

6. The parallel program scalability bottleneck detection method according to claim 5, wherein, the removing edges that meet pre-defined criteria in the program structure graph comprises:

only preserving a structure comprising Message Passing Interface (MPI) invocations and loops; and removing a loop vertex whose nested depth exceeds the pre-defined threshold.

7. The parallel program scalability bottleneck detection method according to claim 5, wherein, the merging a plurality of vertices into one vertex comprises:

merging continuous vertices with tiny workload into a larger vertex, for computation vertices in the program structure graph.

8. The parallel program scalability bottleneck detection method according to claim 1, wherein, the collecting performance data based on sampling comprises:

collecting hardware counter performance data of each vertex of the program structure graph during execution, a hardware counter interface being configured to sample and collect hardware performance data, the program being interrupted at regular clock cycles and program call stack and related performance data being recorded; and associating performance data with a corresponding program structure graph vertex, according to the program call stack information.

9. The parallel program scalability bottleneck detection method according to claim 1, wherein, the collecting inter-process communication dependence performance data, comprises:

sampling-based instrumentation, inserted code that collects performance data being executed based on sampling.

10. The parallel program scalability bottleneck detection method according to claim 9, wherein, the sampling-based instrumentation comprises:

executing statement that generates a random number at a beginning of the inserted code;

generating one random number every time the inserted code is executed, judging whether the random number generated every time the inserted code is executed falls into an interval of a pre-defined threshold; and collecting performance data only when the random number generated every time the inserted code is executed falls into the interval of the pre-defined threshold.

11. The parallel program scalability bottleneck detection method according to claim 1, the collecting inter-process communication dependence performance data, comprises:

graph-guided communication compression, communication operation parameters being only recorded once for repeated communications with same parameters, and communication operations on a same group of program structure graph vertices for different time steps being merged together.

12. The parallel program scalability bottleneck detection method according to claim 11, wherein, the collecting performance data further comprises:

collecting calling information before an entry and an exit of indirect calls, linking the calling information with real function calls with unique function IDs, and then refining the program structure graph obtained after an inter-procedural analysis.

13. The parallel program scalability bottleneck detection method according to claim 1, wherein, the collecting inter-process communication dependence performance data, comprises:

(1) using MPI_Comm_get_info to acquire the information, for collective communication;

(2) recording a source or dest process and tag directly, for blocking point to point communication; and (3) using status parameter of synchronous communication functions to identify communication dependence, for non-blocking communication.

14. The parallel program scalability bottleneck detection method according to claim 3, further comprising:

obtaining one or more causal paths that connect a set of problematic vertices, as scalability bottleneck candidates.

15. The parallel program scalability bottleneck detection method according to claim 1, wherein, the performance data of each vertex of the program structure graph is hardware counter performance data.

16. A computing device, comprising a memory, wherein, the memory has computer executable instructions stored thereon, and the executable instructions execute the parallel program scalability bottleneck detection method of claim 1 by the processor.

* * * * *